May 9, 1967
N. T. DICK
3,319,044
ELECTRO-SLAG WELDING BACKUP MEMBER
Filed June 24, 1964
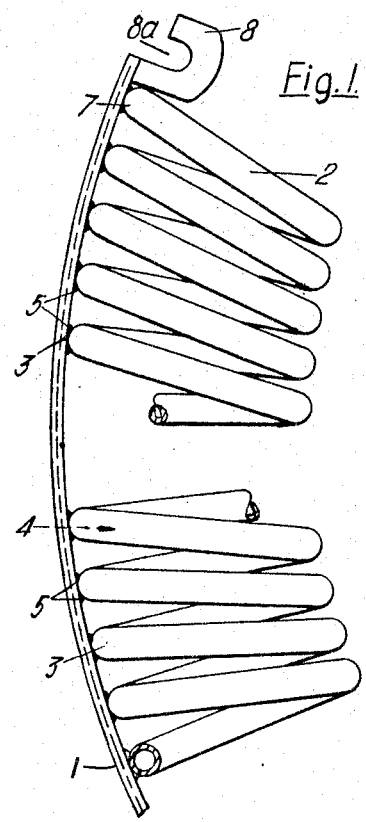
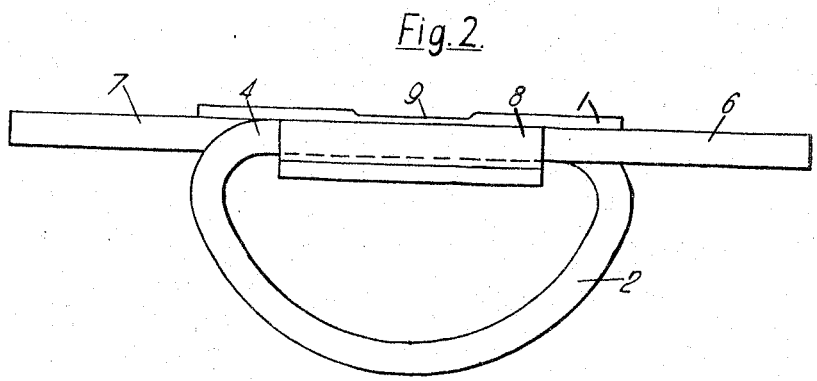
Inventor
Norman T. Dick
By *J. P. Moran*
Attorney 3,319,044
ELECTRO-SLAG WELDING BACKUP MEMBER
Norman T. Dick, London, England, assignor to Babcock & Wilcox Limited, London, England, a corporation of Great Britain
Filed June 24, 1964, Ser. No. 377,725
Claims priority, application Great Britain, June 25, 1963, 25,147/63
7 Claims. (Cl. 219—160)

This invention relates to welding. In uniting workpieces by an electro-slag welding process, weld metal is deposited in a gap between the workpieces and some form of backing must be provided at the sides of the gap to retain the metal until it has solidified. The use of a water-cooled copper shoe moving along the gap in synchronism with the welding head has been suggested and it has also been suggested that a fixed backing strip should be used. In either case, prevention of the leakage of molten slag may be difficult, especially when the workpieces are curved, as in forming a circumferential weld between pipes, since it may not be easy to ensure conformity between the curvature of the workpieces and the backing member.

According to the present invention, there is provided a backing member for use in bridging a gap between two curved workpieces whilst welding the workpieces together by an electro-slag welding process, the member including a longitudinally flexible backing strap and a flexible conduit through which cooling fluid may be passed, the flexible conduit being connected to one face of the strap at locations distributed lengthwise of the strap by heat conducting joints.

By way of example, an embodiment of the invention will now be described with reference to the accompanying drawing in which:

FIGURE 1 shows a side view of a backing member, curved to conform to the inner surfaces of pipes arranged to be welded together end-to-end; and FIGURE 2 shows a plan view of the backing member shown in FIGURE 1 when in its straight condition.

The backing member shown in the drawings includes a backing strap 1 to one face of which a helical conduit 2 is joined at locations 3 distributed along the length of the backing strap 1.

The strap 1 is formed by a strip of copper and is flexible along its length so that, although straight in its relaxed condition, it can be deformed to adopt the curvature of arcuate workpieces.

The helical conduit 2 is made from copper and is of such a form that each convolution provides a generally straight portion 4 lying transversely of the strap 1 and each portion 4 is connected to the strap 1 by means of brazing or soldering 5. Thus, at each location 3, heat may flow easily between the strap 1 and the conduit 2. At its ends, the conduit 2 is provided with an inlet 6 and an outlet 7. Thus, due to the good thermal conductivity of the strap 1, the tube 2 and the joints effected by brazing 5, coolant flowing through the conduit 2 between the inlet 6 and the outlet 7 will ensure that the backing member does not become overheated and the deposited weld metal is adequately chilled.

Due to its helical form, the conduit 2 is sufficiently flexible to bend with the strap 1 to accommodate a considerable range of curvatures. When the strap 1 is straight, the convolutions of the conduit 2 are uniformly separated but when it is curved as shown in the drawing, the separation remote from the strap 1 will be less than that at the strap 1.

To enable the backing member shown in the drawing to be coupled readily to a similar backing member, the strap 1 is provided at one end with a hook-shaped strip 8. The strip 8 is such that when the backing member is placed end-to-end with a similar member, the straight portion 4 of the endmost convolution of the conduit 2 lies in the recess 8a of the strip 8.

To enable the weld metal to protrude from the gap in which the weld metal is deposited, a groove 9 is provided lengthwise of the surface of the strap 1 to which the conduit 2 is not connected. The centre line of the groove 9 and the centre line of the locations at which the conduit 2 is connected to the strap 1 extend along the centre line of the strap 1.

In welding together two pipes or tubular sections of large diameter, by a method such as is described in copending patent application Ser. No. 377,600, filed June 24, 1964, for example, the pipes or sections are set up end-to-end in the desired juxtapositions. The inner side of the gap between the pipes in which the weld metal is to be deposited is lined by a ring of the backing members shown in the accompanying drawing, the groove 9 being aligned with the gap. To hold them in contact with the inner peripheries of the workpieces, bridge members extending across the gap are welded to the workpieces. The backing members lie beneath the bridge members and wedging means is introduced between each bridge member and the backing member lying beneath it at one or more locations between the ends of each backing member to curve the latter and so urge them into contact throughout their lengths with the inner peripheries of the workpieces.

The backing members that have been described are especially useful in electro-slag welding by a controlled grain method since the gaps in such welding tend to be so small, 3/4" for instance, that even a small loss of slag past the backing means could represent a large proportion of the total available in the welding region.

I claim:
1. A backing member for use in bridging a gap between two curved workpieces whilst welding the workpieces together by an electro-slag welding process, the member including a longitudinally flexible backing strap and a flexible conduit through which cooling fluid may be passed, the flexible conduit being helical and connected to one face of the strap at locations distributed lengthwise of the strap by heat conducting joints.

2. A backing member as claimed in claim 1, in which each convolution of the helix includes a portion that is generally straight and each heat conducting joint connects a straight portion to the strap.

3. A backing member as claimed in claim 1 in which the conduit is a copper tube, the strap is formed from copper and the joints are formed by brazing or soldering.

4. A backing member as claimed in claim 1 in which the face to which the flexible conduit is not joined is formed with a longitudinally extending groove.

5. A backing member as claimed in claim 1 and provided with coupling means whereby the backing member may be connected end-to-end with a similar backing member.

6. A backing member as claimed in claim 5, in which the coupling means includes a hook such that when the backing member lies end-to-end with a similar backing member, the hook overlies a portion of the conduit of the similar backing member.

7. A backing member for use in bridging a gap between two curved workpieces while welding the workpieces together by an electro-slag welding process, the member including an elongated, longitudinally flexible backing strap and a flexible conduit through which cooling fluid may be passed, the flexible conduit being convoluted and connected by heat conducting joints to one face of the strap at longitudinally distributed spaced locations.

References Cited by the Examiner

UNITED STATES PATENTS 2,430,266  11/1947  Zimmerman ---------- 228—50
3,219,250  11/1965  Drummond ------ 219—160 X RICHARD M. WOOD, *Primary Examiner.*

B. A. STEIN, *Assistant Examiner.*